INVENTORS
WILLIAM R. POSTLEWAITE
MILTON LUDWIG
BY *P.G. Johnston*
*Charles J. Gibeau*
ATTORNEYS United States Patent Office 3,266,256
Patented August 16, 1966

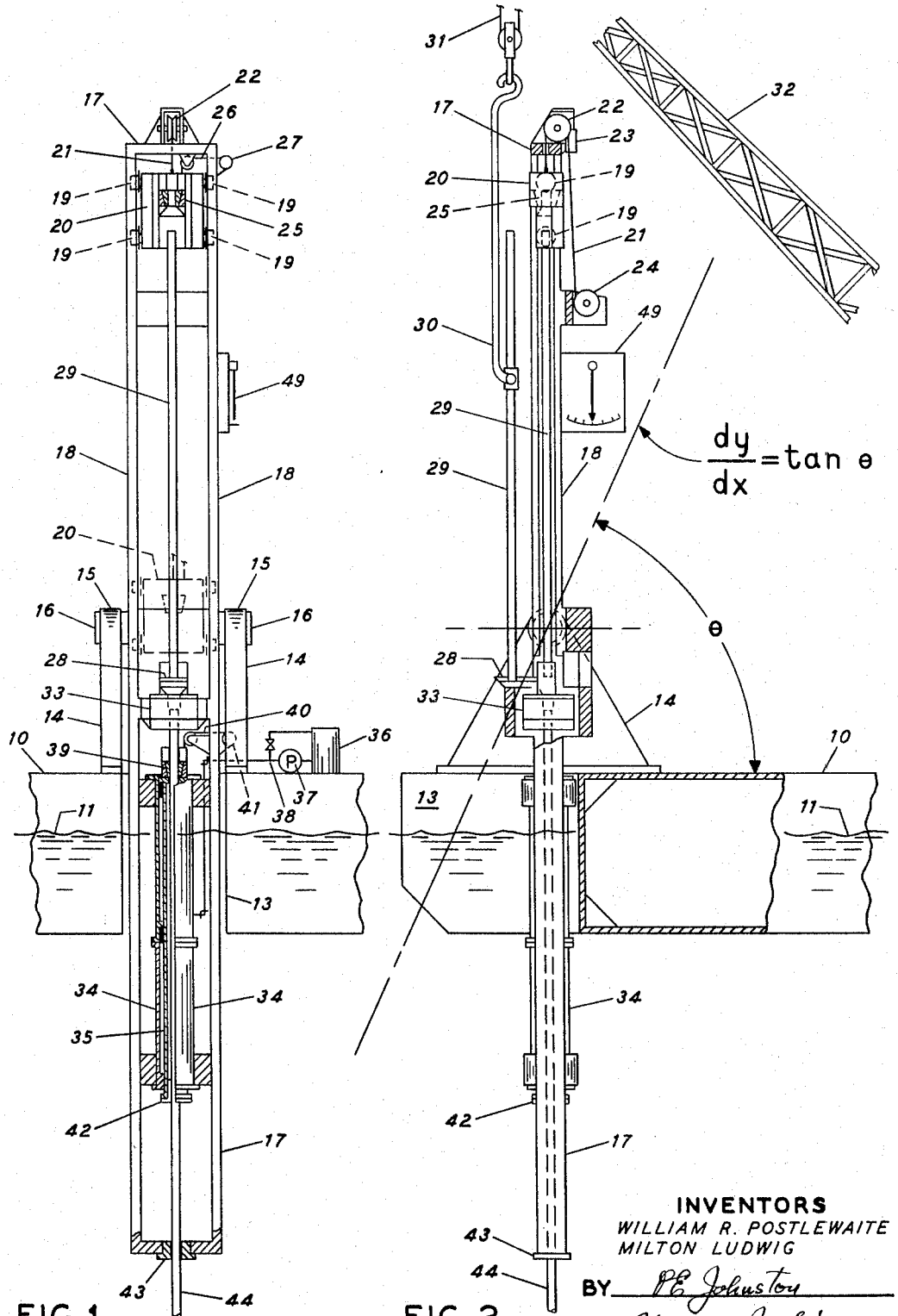

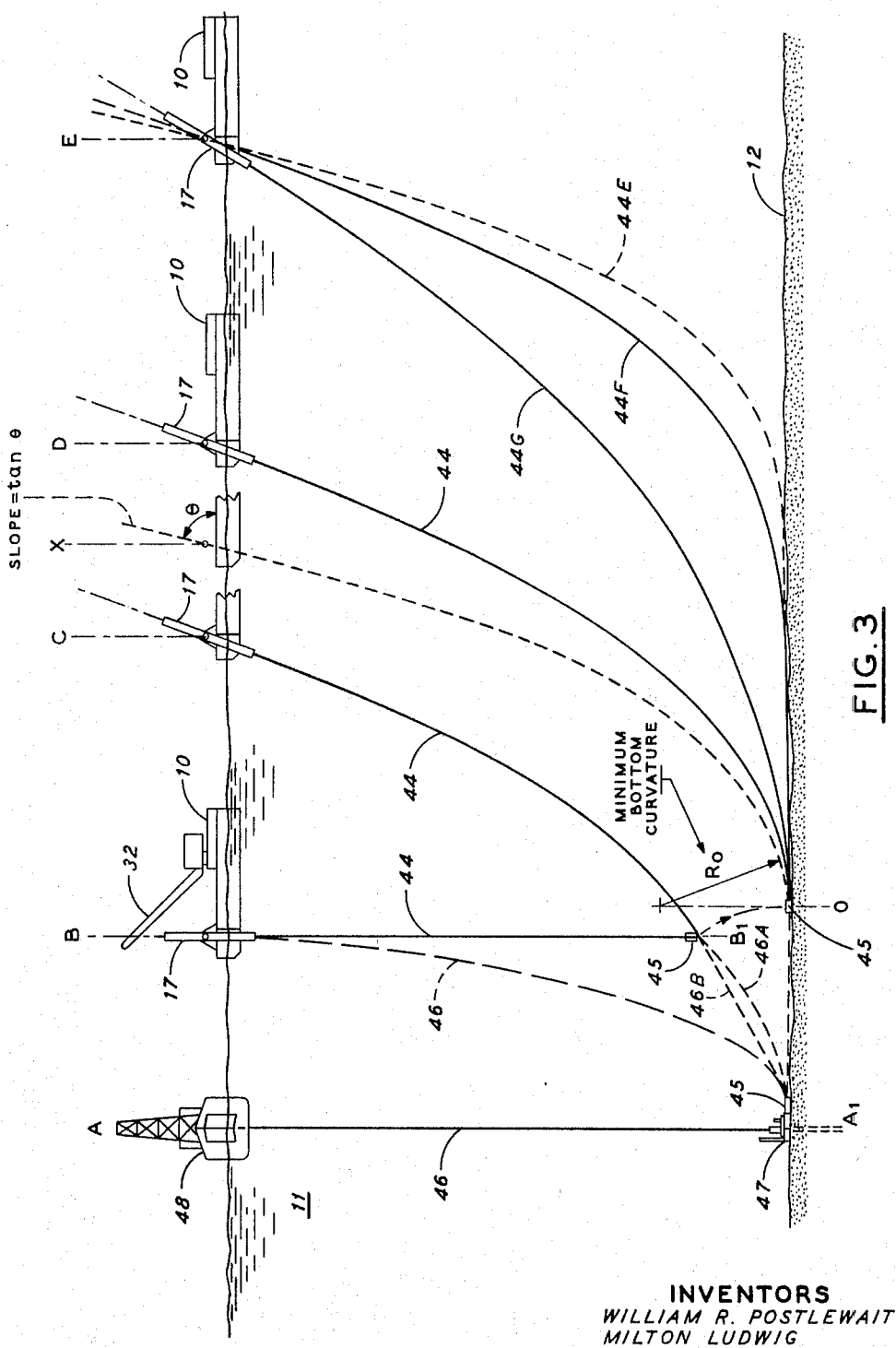

3,266,256
METHOD FOR LAYING SUBMARINE PIPE LINES
William R. Postlewaite, Menlo Park, and Milton Ludwig, Berkeley, Calif., assignors to Chevron Research Company, a corporation of Delaware
Filed Mar. 27, 1963, Ser. No. 268,368
7 Claims. (Cl. 61—72.3)

This invention relates to a method and apparatus for laying submarine pipe lines and particularly for assembling the pipe line on a floating barge and laying it in deep water without stressing the pipe line material excessively or kinking the pipe line at its terminals or, while it is being laid, at the point where it contacts the underwater bottom.

As the search for offshore oil progresses, it has been found to be feasible to drill and complete wells in deeper water, upwardly of 1000 feet or more. To transport the fluid products of the wells to shore or from individual submerged wells to gathering stations on offshore platforms, it is necessary to use submarine pipe lines, which may be of considerable length. This invention comprehends the assembling and laying of such a pipe line from a floating vessel, hereinafter called a barge, by a method and means which will insure that the pipe line will be laid on the ocean bottom without being kinked or overstressed, and which will permit a control of the forces required to pull the lower end of such a pipe line into engagement with a submarine terminal therefore, to enable a minimal amount of force to be used for this purpose without at the same time permitting the pipe line to be overstressed by developing short radius bends in the region where it curves into parallelism with the ocean bottom. To accomplish this the pipe laying apparatus is equipped with means for and is operated in a manner, to cause that part of the pipe line being lowered from the barge into the water to assume a predetermined inclination with regard to the horizontal, or alternatively to be supported by the barge in a manner to place a predetermined axial tension in this portion of the pipe line. By controlling these parameters in the manner explained hereinafter, the configuration of the curve of the pipe line along its length suspended in the water and to the point where it contacts the ocean bottom as well as the axial force applied to the lower end of the pipe line can be controlled in a predetermined manner. It also contemplates laying the pipe line from a large reel of a continuous length of pipe, and with similar provisions to the first-named means for observing and controlling the slope of the pipe as it leaves the pipe laying barge and controlling the resulting line stresses, all of which will be more fully explained below.

Among the objects of this invention are included:

(1) To provide a method and means for fabricating or assembling a continuous pipe line from a barge and lowering it to the underwater bottom under continuous and known stress conditions in the pipe line and in a manner to prevent kinking of the latter at a submarine terminal, such as a submerged well head, or, as it is being laid, at its point of tangency with the bottom.

(2) To provide a method and means for extending a submarine pipe line through a body of water from one of two widely spaced points to the other point, under controlled conditions of stress and bending in the line.

(3) To provide a method and means for extending a pipe line from a floating barge to a connection with a submarine terminal located at a substantial distance from the barge.

(4) To provide a method and means for progressively fabricating and lowering a submarine pipe line to the bottom of deep water and for securing it to an offshore submarine terminal without the use of divers.

These and other objects and advantages will be further apparent from the following specification and the attached drawings, which form a part thereof, and illustrate a preferred method and form of apparatus for carrying out the invention.

In the drawings, FIG. 1 is a front elevational view partly in section of a barge-mounted reciprocating mechanism for successively welding lengths of pipe together and lowering them from the barge to form a continuous submarine pipe line.

FIG. 2 is a side elevational view, partially in section, of the mechanism of FIG. 1, and illustrates the function of a trunnion bearing arrangement supporting it on the barge just above its center of gravity, so that it is free to assume a slope that is tangent at this location to the catenary curve assumed by the pipe due to the downward and horizontal pull of the submarine pipe line.

FIG. 3 is a diagrammatic view in elevation illustrating a pipe laying barge and the disposition of the submarine pipe line being lowered therefrom, at various stages of opertion in accordance with this method.

Figure 6:
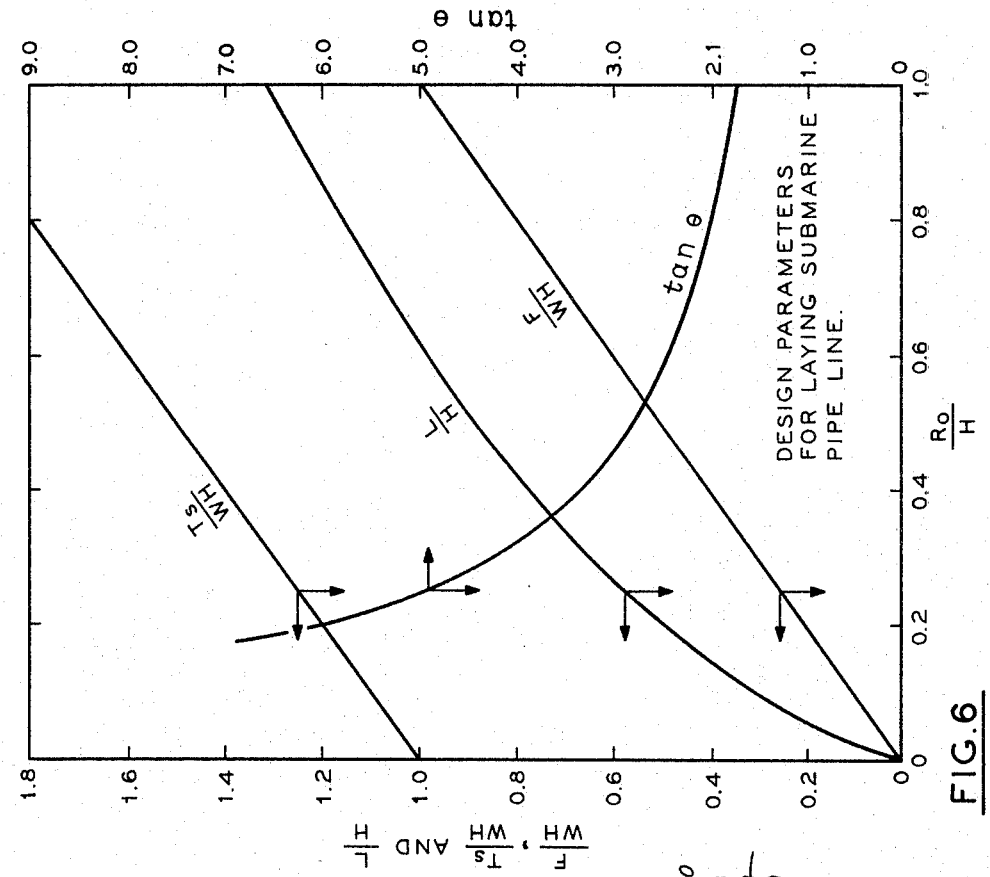

FIG. 6 presents a group of curves illustrating the relationships and values of various design parameters useful for laying a submarine pipe line in accordance with this invention.

Referring to the drawings, reference numeral 10 designates generally a vessel or barge floating on the body of water 11 through which the submarine line is to be lowered to the bottom 12. In the embodiment of the invention illustrated in FIGS. 1-3, a slot 13 is provided extending inwardly from one end of barge 10 and on each side is placed a stout upright pedestal 14, each having a bearing 15 to support opposed horizontal trunnions 16, one projecting from each side of a vertically disposed structural frame 17. Desirably, the center of gravity of frame 17 and its related assembly of other parts is slightly below the axis of trunnions 16 and bearings 15 so that, while rotation about this axis is permitted, the frame will normally tend to stand vertically.

The side members 18 of the upper part of frame 17 comprise inwardly facing channels to form a track for the wheels 19 of a car 20, supported by a cable 21 passing over sheave 22 and engaging a weight indicator 23 at the top of the frame, and being movable upwardly and downwardly by a motor-driven drum 24. On the car 20 is mounted a pair of power-driven pipe slips 25 actuated by a cable 26 and a motor-driven drum 27 mounted on the car. Suitable power cables and control means (not shown) are provided and lead to a conveniently located control station for the operator of the equipment.

At one side of frame 17 is a landing plate or platform 28 to receive the lower end of a first length of pipe which has been picked up from a suitable storage rack (not shown) by a pipe grip 30 suspended by a cable 31 from a crane boom 32. In this description each successive length of pipe being placed in frame 17 for welding to the upper end of the pipe line extending below it shall be designated by the numeral 29. With the upper end of the length of pipe 29 swung inwardly toward the frame 17, the car 20 is lowered a short distance so that slips 25 may be engaged with the upper end of this length of pipe. Thereafter, the car 20 is pulled up slightly to lift and to swing the entire length of pipe 29 into frame 17 and then car 20 is dropped to lower the bottom end of this length of pipe into and partly through the bore of an automatic welding head 33 mounted near the center of frame 17. The construction and operation of such a welding head are well known in this art and need no detailed description herein.

Below welding head 33 is an elongated vertical cylinder 34 in which is slidably mounted an elongated hollow piston 35. The cylinder is arranged to be supplied with hydraulic fluid from a small tank 36, under the control of pump 37 and piping and valve means generally designated 38. The top of piston 35 supports another set of pipe slips 39, actuated by cable 40 and motor-driven drum 41. With the piston 35 in its uppermost position, and with car 20 in the lower position indicated by the dotted lines in FIG. 1, slips 39 are actuated to grip the length 29 of pipe as slips 25 are released therefrom. Piston 35 is then lowered to place the upper end of the first length of pipe at a predetermined location in the welding head 33, where it is secured by the customary centering or gripping means therein. This length of pipe is now ready to be contacted by the bottom end of another length of pipe to be welded thereto.

The next length of pipe, which, as noted heretofore, also shall be designated by the numeral 29, is placed by the crane boom 32 and pipe grip 30 as just described, in the slips 25 of car 20 while the car is in its upper position. The slips 25 are engaged and the lower end of the new length of pipe is lowered into the welding head 33 to rest upon and be welded to the top of the first length suspended therein. After the weld is complete the pipe is released from the welding head and the slips 39 and the car 20 is lowered to lower the connected pipe through the hollow piston and the guide 42 at the bottom end of it and through the guide 43 at the bottom of the frame 17. Piston 35 is then lifted, slips 39 are engaged, slips 25 are released and the two welded-together pipe sections are lowered until the top of the newly added length 29 is received in the welding head. This procedure is repeated for successive lengths of pipe to attain the total length required for the submarine pipe line, which may be designated 44 for convenience of description herein.

The lower end of the first section of pipe lowered through frame 17 is swung upwardly with the frame in slot 13 to receive a coupling means, generally designated 45, to which a pull-in cable 46 can be attached which extends downwardly (FIG. 3) to a submarine well terminal 47 and thence upwardly to a winch on work barge 48. Details of such a coupling means and the methods and means for connecting it to a submarine terminal, such as a well head, are not a part of the present invention but are disclosed and claimed in a copending joint application by Edward T. Chan and William R. Postlewaite, Serial No. 235,432, filed November 5, 1962, and entitled, "Method and Apparatus for Offshore Well Completion."

Figure 5:
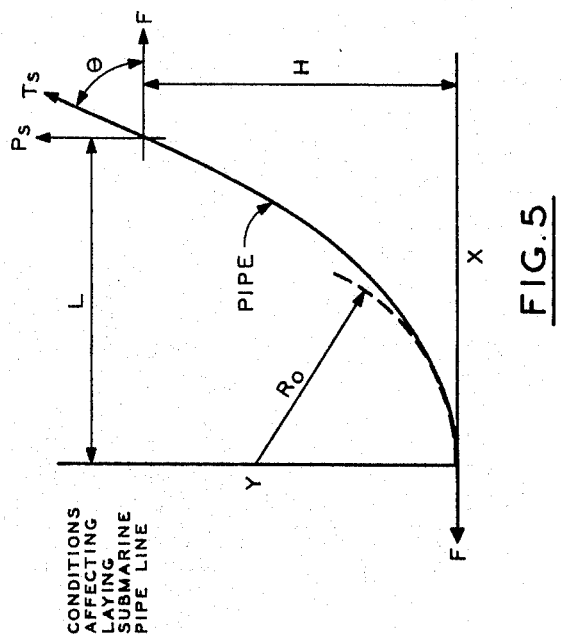
FIG. 5 is a diagrammatic illustration of the form of and conditions affecting the catenary curve assumed by the pipe line while being laid from a barge.

As stated heretofore, this invention is of particular interest for laying a pipe line at the bottom of relatively deep water from a floating barge. Under these conditions, the length of pipe required to reach from the barge to the ocean bottom will be long enough to provide sufficient flexibility in this length of pipe so that, for the purpose of this invention, the stiffness of the pipe may be disregarded. This length of pipe can therefore be assumed to be supported between its ends only by the effect of axial tension, and the deflection curve for it will be a catenary of the form illustrated diagrammatically in FIG. 5.

The bending stress in a pipe is inversely proportional to the radius of curvature of the deflection curve. For the pipe line being laid on the ocean bottom from a barge the bending stress will be a maximum at the ocean bottom where the radius of curvature of the catenary is a minimum.

The total stress in the pipe is the sum of the bending stress and the direct stress due to axial tension. As will become apparent hereinafter, the stress due to axial tension normally, for the purpose of this invention, will be small enough to be disregarded.

In order to determine the conditions that must be applied to the pipe laying operation in order to lay the submarine pipe line without subjecting it to excessive stress, the nature of the deflection curve it assumes will be investigated. The following notations will be used for this purpose.

$A$ = cross sectional area of steel pipe wall, in square inches.
$r$ = radius of outer surface of the pipe, in inches.
$W$ = weight per unit length of pipe corrected for buoyancy, in pounds per inch.
$E$ = modulus of elasticity of steel, pounds per square inch.
$T$ = tension in pipe, in pounds.
$T_s$ = tension in pipe at surface of the water, in pounds.
$F$ = horizontal component of force in pipe, in pounds.
$P_s$ = vertical component of force in pipe at surface of the water, in pounds.
$S_b$ = bending stress in pipe at the bottom of the ocean, in pounds per square inch.
$S_d$ = direct stress in pipe due to axial tension, in pounds per square inch.
$L$ = horizontal distance from the point of tangency of the pipe line with the bottom of the ocean to the point at which the pipe line reaches the surface of the water, in inches.
$H$ = depth of water, in inches.
$R_0$ = radius of deflection curve of pipe line at the point of tangency to the ocean bottom, in inches.
$\theta$ = angle between the pipe line and the horizontal at the surface of the water.
$\tan \theta$ = slope of pipe line at the surface of the water.
$x$ = horizontal distance from point of tangency of the pipe line with the ocean bottom, in inches.
$y$ = vertical distance from the ocean bottom, in inches.
$dy/dx$ = slope of pipe line, = $\tan \theta$ at the surface of the water.

The equation for the catenary curve is (1) $$\frac{Wy}{F} = \cosh \frac{Wx}{F} - 1$$

Then (2) $$\frac{dy}{dx} = \sinh \frac{Wx}{F} = \sqrt{\left(\frac{Wy}{F}\right)^2 + \frac{2Wy}{F}}$$

(3) $$\frac{d^2y}{dx^2} = \frac{W}{F} \cosh \frac{Wx}{F} = \frac{W}{F}$$

for $x = 0$ (at the bottom).

A formula from strength of materials gives (4) $$R_0 = \frac{Er}{S_b}$$

Also, at the point of tangency with the ocean bottom $$R_0 = \frac{1}{\frac{d^2y}{dx^2}}$$

Thus, substituting from Equation 3, (5) $$R_0 = \frac{F}{W}$$

and (6) $$F = WR_0$$

regardless of depth. The component of force F is the same at any point along the entire suspended length of the pipe line, and also at the bottom end of it; also, from Equation 5.

(7) $$\frac{F}{WH} = \frac{R_0}{H}$$

From Equation 4 a value of $R_0$ may be calculated for the maximum permissible bending stress in the pipe. With the value of $R_0$ thus obtained, Equation 6 may be used to find the minimum horizontal force F that must be maintained, to prevent an excessive bending stress from developing in the pipe line. It will be noted that this force F may be measured at the surface end of the pipe line at the pipe laying barge, or at the bottom end by means of the pull exerted by the pull-in cable 46.

The minimum permissible value of $R_0$, and hence the maximum pipe stress also can be controlled by controlling the axial tension in the pipe at the surface of the water, i.e. at the pipe laying barge.

From the relationship of the force components (8) $$T = F\sqrt{1 + \left(\frac{dy}{dx}\right)^2}$$

Substituting from Equation 2 for the expression $dy/dx$ and solving, (9) $$T = F + Wy$$

At the surface of the water,
$$y = H$$
Therefore, from (9),

(10) $$\frac{T_s}{WH} = 1 + \frac{F}{WH}$$

Substituting from Equation 7

(11) $$\frac{T_s}{WH} = 1 + \frac{R_0}{H}$$

or

(12) $$T_s = F\left(1 + \frac{H}{R_0}\right)$$

The slope of the pipe line with respect to the horizontal at the surface of the water is, from Equation 2

(13) $$\tan\theta = \frac{dy}{dx} = \sqrt{\left(\frac{WH}{F}\right)^2 + 2\frac{WH}{F}}$$

Substituting from Equation 7

$$\tan\theta = \sqrt{\left(\frac{H}{R_0}\right)^2 + 2\frac{H}{R_0}}$$

solving

(14) $$\tan\theta = \frac{H}{R_0}\sqrt{1 + 2\frac{R_0}{H}}$$

The ratio of the horizontal distance from the point of tangency of the pipe line with the ocean bottom to the elevation above bottom of a point along the pipe line can be determined from the relationship of Equations 1 and 2 as follows:

(15) $$\frac{L}{H} = \frac{R_0}{H}\cosh^{-1}\left(1 + \frac{H}{R_0}\right)$$
$$= \frac{R_0}{H}\ln\left(1 + \frac{R_0}{H} + \sqrt{\left(\frac{H}{R_0}\right)^2 + 2\frac{H}{R_0}}\right)$$

The ratios $F/WH$, $T_s/WH$, $L/H$, and $\tan\theta$ for $y = H$, are plotted in FIG. 6 as functions of the ratio $R_0/H$. These ratios are dimensionless, and hence the curves of FIG. 6 may be used to obtain the values of these ratios as design parameters from which can be determined the pertinent forces and angles which apply to laying submarine pipe lines of various physical dimensions, of various materials, and in various or varying water depths.

For example, presume it is desired to lay safely a steel pipe line wherein water depth is 600 feet; outside diameter of the pipe is 4.5 inches; wall thickness of the pipe is 0.337 inch; net effective weight of the pipe when filled with air and submerged in water is 7.87 pounds per foot; modulus of elasticity of the steel is $30 \times 10^6$ pounds per square inch; permissible bending stress in the pipe is 37,500 pounds per square inch.

Then $H = 7200$ inches
$r = 2.25$ inches
$A = 4.41$ square inches
$W = .656$ pounds per inch
$E = 30 \times 10^6$ pounds per square inch
$S_b = 37,500$ pounds per square inch The minimum permissible radius of curvature of the pipe line at the point of tangency to the ocean bottom calculated from Equation 4 is $R_0 = 1800$ inches or 150 feet. If this radius is permitted to become less than the calculated amount, the pipe will be overstressed, and the subsequent usefulness of the pipe line will be diminished or destroyed. It is necessary therefore that the pipe laying procedure be operated in a manner to prevent this occurrence.

The ratio $R_0/H$ is equal to .25 and the product $W \cdot H$ is equal to 4722. For this ratio and product the following values may be determined from the curves of FIG. 6.

$F = 1180$ pounds
$T_s = 5920$ pounds
$\tan\theta = 4.90$
$L = 348$ feet

In checking the direct stress $S_d$ in the pipe line due to the axial tension which occurs in it under the conditions specified above, it is found that this stress in the bottom end portion of the pipe, which is caused by the force F, is $$\frac{F}{A} = \frac{1180}{4.40}$$

or 268 pounds per square inch.

This stress is only 0.74% of the permissible bending stress $S_b$ of 37,500 pounds per square inch, and can, for practical purposes, be neglected.

At the surface of the water the direct stress is caused by the force $T_s$, which has a value of 5920 pounds. The direct stress $S_d$ in this portion of the pipe is, therefore, $$\frac{5920}{4.41}$$

or 1340 pounds per square inch. There is, however, no bending stress in this portion of the pipe line. The bending stress $S_b$ is therefore the significant stress which controls the design of the pipeline and the pipe laying procedure.

The value F, $T_s$, L and $\tan\theta$ are individually interrelated with the value of $R_0$ for the curve assumed by the pipe line while it is being laid, as is shown by the analysis set forth previously. Therefore, by measuring any one of these values and maintaining its amount at or in the proper relationship to the derived value, the pipe line may safely be laid in deep water with the assurance that it will not inadvertently be overstressed and kinked during the pipe laying procedure.

For example, and as a preferred embodiment of this invention, the pipe laying barge is equipped with appropriate instrumentation so that the slope of the top end portion of the pipe line can be determined constantly. In the modification of the invention illustrated in FIGS. 1 to 3, this may be done by the inclination indicator 49 operably connected to the frame 17 of the pipe welding apparatus. In the modification illustrated in FIG. 4 this may be done by the inclination indicator operably connected to the upper end of the pipe being laid, in a manner to be described more fully hereinafter.

An illustrative procedure for laying a pipe line in accordance with this invention is shown in FIG. 3. The submarine pipe line terminal 47 has been affixed to a submerged wellhead on the ocean bottom 12 directly below the barge 48 as indicated at the position $A_1$ in the drawing. The pull-in cable 46 extends downwardly from the barge 48 and passes over a pulley mounted in terminal 47 and thence extends upwardly to the pipe laying barge 10 at Station B, as indicated by the dotted line A₁–B. Means not shown are provided for maintaining the barge 48 substantially at station A and for holding barge 10 at a station such as station B but permitting it to be moved under controlled conditions to other stations such as C, D and E as the laying of the pipeline progresses. Such means may, of course, include anchoring systems, tugs, and positioning, maneuvering and propelling means incorporated in the barges.

As described heretofore, when the apparatus shown in FIGS. 1 and 2 is being used on the pipe laying barge the pull-in cable 46 is attached to the lower end of the pipe line by a coupling means 45. The pipe laying barge 10 is stationed at position B at sufficient distance from barge 48 and from the submerged well-head, which preferably is less than the distance L calculated heretofore, and the string of pipe is assembled and fed vertically downwardly from the barge until the end of the pipe approaches to within approximately 100 feet of the ocean bottom. During this time the pull-in line 46 is taken up by a winch (not shown) on the barge 48 only enough to prevent it from becoming tangled but with enough slack left in it to prevent it from pulling transversely on the bottom end of the pipe string, and may be disposed as indicated by the dotted line 46A.

The pipe laying barge is now moved in the direction of the pipe line route to station C. During this movement the pull-in line 46 is held firmly on barge 48 and the portion of it between the terminal 47 and the coupling 45 becomes taut as indicated by the dotted line 46B and holds the lower end of the string of pipe 44 approximately at the location of point B₁. The force on the end of the pipeline is transmitted through it to the frame 17 on barge 10 and the frame tilts from the vertical through an angle in accordance with the slope assumed by the upper end of the string of pipe, which is seated in the frame. The slope of the frame is measured by an inclination indicator, shown schematically at 49, operably connected to it. The movement of barge 10 is continued until the amount of the slope of the frame is less than the value of tangent $\theta$ which, it will be understood, is predetermined in the manner explained heretofore for the particular characteristics of the pipe being laid and the depth of the water at this location.

When the slope of frame 17 is less than the predetermined value for tangent $\theta$ additional lengths of pipe are welded to the top portion of the pipeline in the manner described heretofore to lengthen the amount of pipeline in the water. As the pipeline lengthens the lower end of it approaches the ocean bottom, the taut portion 46B of line 46 acting as a radius for this movement, until it lands in contact with the ocean bottom at point O. During the time additional lengths are being added to the top end of the pipeline the angle it makes with the horizontal at the surface of the water increases and the frame 17 rotates toward a vertical position. The slope of frame 17 is determined each time a new section is added to the pipeline and, as necessary, the barge 10 is moved along the direction of the pipeline route to keep this slope below the predetermined value for tangent $\theta$. Thus, when the pipelaying barge reaches station X the lower end of the pipeline is in contact with the ocean bottom, the slope $dy/dx$ of its upper end has the value of tangent $\theta$, and the deflection curve of the pipeline at the point of tangency to the ocean bottom has the radius $R_0$ which, as explained heretofore, is the minimum radius that can be imposed on this portion of the pipeline without causing kinking of the pipe. Also at this time the force exerted by the pull-in line 46 on the lower end of the pipeline will have the predetermined value for F, the axial tension in the upper portion of the pipeline will have the predetermined value for $T_s$ and the pipelaying barge will be at the predetermined distance L from the point of contact of the lower end of pipeline with the ocean bottom. The pipeline will be disposed in a curve similar to that illustrated in FIG. 5.

In field practice, considering the environment in which the pipeline is being laid and the unpredictable effects of wind and water forces on the pipelaying barge, it is hazardous to permit the pipeline to assume a curve which reduces $R_0$ to its minimum predetermined value. Under these conditions any inadvertent movement of the pipelaying barge 10 in a reverse direction towards the barge 48, or any additional lengthening of the pipeline, or any slacking off of the pull-in line 46 would reduce the radius of curvature of the bottom deflection curve and cause the pipeline to kink. Therefore, it is better practice to maintain the slope $dy/dx$ at some value less than that predetermined for tangent $\theta$ thereby automatically applying a safety factor to the procedure. Thus, station X as indicated in FIG. 3 can be termed an imaginary station and during the pipelaying procedure the barge 10 will proceed from station C to station D while the slope of frame 17 is maintained at some value less than tangent $\theta$.

Station D indicates the disposition of the pipeline with the lower end of it in contact with the ocean bottom and held at the point O through increased tension in the pull-in line 46 while the slope of the upper portion of the pipeline is somewhat less than it would be at station X. At station D the axial tension in the pipe is greater than it would be at station X and the pipelaying barge is at a greater distance from the point O than the predetermined distance L.

It is desired now to place enough of the pipeline in contact with the ocean bottom so that the coupling 45 can be pulled into contact with and connected to terminal 47 without exerting an undue amount of reaction in the terminal and without causing the end of the pipeline to approach the terminal at such a vertical angle that the connection cannot conveniently be made. The pipelaying barge therefore proceeds to station E while additional lengths of pipe are being added to the top end of the pipeline until the submerged portion of the line is disposed in a curve similar to that illustrated at 44F. For comparison the curve which the pipeline would assume if the values of the forces applied to it were substantially equal to the values predetermined therefore is illustrated by the dotted curve 44E. The pull-in line 46 is now winched in aboard barge 48 and the coupling 45 is drawn into engagement with the wellhead terminal and secured to it, as in the manner illustrated in the aforementioned application Serial No. 235,432. At this time, and presuming the pipelaying barge has remained at station E, the pipeline will be disposed in a curve similar to that illustrated at 44G but with the bottom portion of this curve extended from substantially the point O to the terminal 47.

After the lower end of the pipeline is connected to the submarine terminal the pipelaying barge proceeds along the course of the pipeline while the pipeline is lengthened by adding pipe sections to its upper end and while controlling the slope of this end of the pipeline to an amount which is less than a value of tangent $\theta$ which is predetermined as appropriate for the depth of water over which the pipelaying barge is at that time passing.

As explained heretofore, the critical forces and angles which apply during the pipelaying procedure are dependent on the characteristics of the pipe and the depth of the water in which the pipeline is being laid and even though a particular pipe may be used throughout the entire length of the pipeline it can be expected that, particularly for lines of appreciable length, the water depth will have a considerable variation along the route of the pipelaying barge. By the techniques of this invention, and particularly with reference to FIG. 6, the forces and angles which apply for any and all of the varying conditions encountered during the pipelaying operation can be predetermined in a rapid and convenient manner to permit the pipeline to be laid in a continuous operation with the assurance that it will not be damaged or destroyed by inadvertently being overstressed. A particular danger that the method of this invention avoids is the possibility of decreasing the radius $R_0$ below a minimum acceptable value through the effect of an upwardly sloping underwater bottom or, particularly in very deep water, through permitting the pipeline to be lowered from the pipelaying barge at an angle with a slope greater than that of tangent $\theta$.

As stated heretofore the value $T_s$ may also be used to control the disposition of the pipeline as it is being laid to keep its curvature within safe limits. With the apparatus of this invention this force may conveniently be determined by the weight indicator 23 each time a new section is added to the upper end of the pipeline and after the welding head and slips 39 are released from engagement with it. Also, in the initial stages of the pipelaying operation, the force F exerted by the pull-in line 46 on the lower end of the pipeline, as measured on barge 48, may be used for this purpose.

In some locations and particularly where coated pipe is being laid the character of the underwater bottom may be such that the pipe cannot safely be dragged over it without exposing to damage the coating and the pipe. Under these conditions by following the method of this invention the lower end of the pipeline may be pulled into engagement with and coupled to a submarine terminal before any appreciable portion of the pipe contacts the underwater bottom. To accomplish this the pipelaying barge is set at the predetermined distance L from the well site and a string of pipe is made up and lowered vertically from the barge in the manner described heretofore. As the end of the pipe approaches the underwater bottom, the pull-in line 46 is placed under tension to an amount not exceeding the predetermined force F and the pipeline is lengthened from the barge until the slope of its upper end approaches the predetermined value for tangent $\theta$. The make-up and lowering of the pipeline and the force applied to its lower end are controlled so that when this force is approximately the predetermined force F and the slope at the upper end of the pipeline is approximately tangent $\theta$, the deflection curve at the lower end of the pipeline will have a radius substantially equal to $R_0$ and the coupling 45 will be in contact with the submarine terminal 47 with no appreciable portion of the pipeline in contact with the underwater bottom. The force on the pull-in cable may now be increased to seat the coupling 45 in the terminal. After the coupling is connected the pipelaying barge is moved along the course of the pipeline and the remainder of the pipeline is laid in the manner described heretofore.

Figure 4:
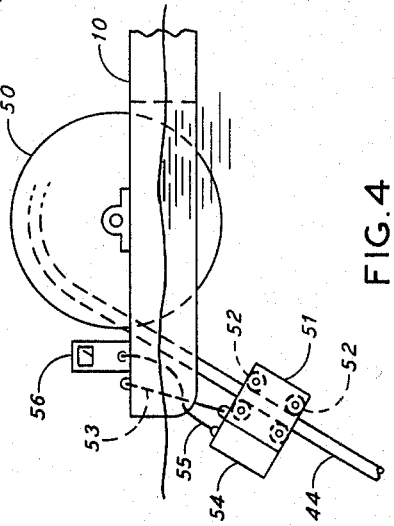
FIG. 4 is a schematic illustration of a means for controlling the laying of a submarine pipe line from a reel of pipe supported on a floating barge, in accordance with this invention.

The application of this invention to the laying of the pipeline from a reel of a continuous length of pipe mounted on the pipelaying barge is illustrated schematically in FIG. 4. The method of laying pipe from a reel is known to the art. Briefly, this method comprises welding sections of pipe together at an on-land location and spooling the resultant continuous pipe length on a large diameter reel. The reel subsequently is mounted on the pipelaying barge in a manner to permit the pipe to be unspooled from the reel and lowered into the water as the pipelaying barge is moved along the course of the pipeline. When the reel is of such diameter that the pipe must be bent to spool it, pipe straightening means are provided on the barge to straighten the pipe as it comes off the reel and as it is being lowered into the water. The devices and techniques by which this accomplished are not part of this invention and hence are not illustrated in the drawings.

FIG. 4 illustrates a pipelaying barge 10 on which is rotatably mounted a spool 50 of a continuous length of pipe which is unspooled from the reel to form the pipeline 44. In accordance with this invention a device is provided to measure the slope of the straightened upper end portion of the pipeline where the latter leaves the pipelaying barge and enters the water. This device may, for example, comprise a carriage 51 which is mounted by rollers 52 on the pipe so that the pipe may move freely through and in relation to the carriage while the latter is constrained to follow any changing slope of the pipe.

The carriage is connected to the pipelaying barge by a flexible linkage 53 which permits the necessary freedom of movement to the carriage while restraining it to the desired position on the pipeline.

An inclination indicator 54, which may be of any appropriate known type, is mounted on the carriage to move with the latter and is connected by a signal transmitting means 55 to a means 56 for displaying or registering the slope in accordance with the angular displacement of device 54. Thus a means is provided on the pipelaying barge for constantly determining the slope of the upper end of the pipeline as it is being laid. The rate at which the pipeline is unspooled and the rate at which the pipelaying barge is moved are controlled to maintain this slope in the desired relationship to the predetermined value of tangent $\theta$, in a manner analogous to that described heretofore. Thus the pipeline may be laid from the reel with complete control over the curve it assumes as it sinks through the water and into contact with the underwater bottom and with the assurance that the pipe will not be overstressed or damaged because of too much or too little force being applied to it as the pipeline is being laid.

It is apparent that changes and modifications may be made to the procedures and apparatus described hereinbefore without departing from the spirit and concept of this invention and it is intended that the invention embrace all equivalents within the scope of the appended claims.

We claim:

1. The method of laying a submarine pipe line at a predetermined location in deep water on an underwater bottom from a barge on the surface of a body of water comprising obtaining for a selected pipe the minimum radius within the elastic limit of said pipe of the curve of tangency of a pipe line made of said pipe in contact at a lower end portion thereof with an underwater bottom at said predetermined location while said pipe-line is supported at an upper end portion thereof in tension from a barge at the surface of a body of water, obtaining the depth of said water at said location, determining for said depth of water the amount of the slope of said upper end portion of said pipe line when the portion of said pipe line adjacent said underwater bottom is disposed in the said curve of said radius and said pipe line is disposed in the form of a catenary between said bottom and said barge and laying said pipe line at said location from said barge while controlling the tension in said pipe line to adjust the slope thereof at said barge to an amount which does not exceed the said amount determined therefor.

2. The method in accordance with claim 1 in which the amount of slope of said pipe line at said barge is controlled by applying an axially directed restraining force $T_s$ of a predetermined amount to said upper end portion, and wherein the said predetermined amount of said restraining force is obtained from the relationship $$T_s = WH + WR_0$$

where:

$W$ = weight per unit length of pipe corrected for buoyancy
$H$ = depth of water
$R_0$ = minimum radius of curvature within the elastic limit of the pipe.

3. The method in accordance with claim 1 in which the amount of slope of said pipe line at said barge is controlled by applying a horizontally directed tensile force F of a predetermined amount to the lower end of said pipe line, and wherein the said predetermined amount of said force is obtained from the relationship $$F = WR_0$$

where:

$W$ = weight per unit length of pipe corrected for buoyancy
$R_0$ = minimum radius of curvature within the elastic limit of the pipe 4. The method of laying a pipeline at the bottom of a body of deep water from a barge moving along the surface thereof comprising obtaining the respective depth of a body of water at each of a plurality of locations measured along the desired route of a pipe line, obtaining for a selected pipe a minimum radius of curvature within the elastic limit of said pipe, determining for said each of said locations the respective slope at the surface of said water of a pipe line made of said pipe when a lower end portion of said pipe line contacts the underwater bottom at a depth of a respective one of said measured locations with a curve of tangency of said radius and an upper end portion of said pipe line is supported in tension at the surface of the water and with said pipe line disposed in the form of a catenary between said bottom and said surface, and moving a barge along said route and lowering said pipe line onto said underwater bottom from said barge while at each of said locations adjusting the slope of said upper end portion to an amount not exceeding the said slope determined for the respective location.

5. The method of laying a pipe line at the bottom of a body of deep water from pipe line laying means moving along the surface thereof comprising obtaining for a selected pipe a minimum radius of curvature within the elastic limit of said pipe, establishing a desired route for a pipe line along the bottom of a body of water, obtaining the respective variations in the depth of water at locations measured along said route, determining for a pipe line made of said pipe the respective variations in slope with relation to said respective variations in the depths of water along said route of an upper portion of said pipe line supported in tension at the surface of said water when a lower portion of said pipe line contacts said bottom at respective said locations with a curve of tangency of said radius and with said pipe line disposed in the form of a catenary between said bottom and said surface, and moving a pipe line laying means on the surface of said water and along said route and continuously laying said pipe line therefrom onto said bottom while controlling the movement of said pipe laying means and the tensile force applied to said pipe line during the pipe line laying operation to adjust the slope of the said upper portion to an amount not exceeding the slope thereof determined for the depth of water at the respective location in which said pipe line is being laid.

6. The method of lowering the end of a pipe line from the surface of the water and into engagement with a submarine terminal therefor comprising obtaining for a selected pipe of a pipe line the minimum radius of curvature within the elastic limit of said pipe, obtaining the depth of water at a submarine terminal for said pipe line, determining the distance on the surface of said water between a first point vertically above said terminal and a second point at which the upper end of said pipe line emerges from said water when the bottom end portion of said pipe line is disposed in a curve of said radius and the lower end of said pipe line is horizontally disposed and at said terminal, determining the slope of said upper end of said pipe line at said second point, locating a pipe laying barge at substantially said second point, lowering the lower end of a pipe line made of said selected pipe from said barge and into said water, connecting a pull-in line between said terminal and said lower end, pulling said lower end toward said terminal while lowering said pipe line from said barge until the slope of the upper end portion of said pipe line at said barge is substantially the same as the said determined slope, and pulling said lower end of said pipe line into engagement with said submarine terminal while controlling the slope of said upper end to an amount not exceeding said determined slope.

7. The method in accordance with claim 6 wherein said pipe laying barge is placed at a greater distance than said second point from said first point, and wherein said lower end of said pipe line is restrained from moving away from said submarine terminal while said pipe line is being lowered from said barge, and wherein said pipe line is lowered from said barge until the bottom end portion thereof contacts the underwater bottom with a curve of tangency having a radius substantially the same as but not less than said minimum radius, and wherein the said lower end of said pipe line is pulled along the underwater bottom by said pull in line and into engagement with said terminal while the slope of the said upper end portion is controlled to an amount not exceeding said determined slope.

References Cited by the Examiner

UNITED STATES PATENTS

| | | | |
|---|---|---|---|
| 1,393,943 | 10/1921 | Chapman | 61—72.3 |
| 1,441,698 | 1/1923 | Meem | 61—72.3 |
| 1,569,764 | 1/1926 | Lockwood | 61—72.3 |
| 2,735,270 | 2/1956 | Collins | 61—72.3 |
| 2,830,548 | 4/1958 | McElvany | 61—72.1 |
| 2,910,835 | 11/1959 | Timothy | 61—72 |
| 3,173,271 | 3/1965 | Wittgenstein | 61—72.1 |

FOREIGN PATENTS 885,276   12/1961   Great Britain.

OTHER REFERENCES

English: Evils of River Crossings, The Oil Weekly, March 18, 1932, pp. 29–33.

Resen: New Pipe-Launching Device Lowers Pipe Gently, Guards against Damage, Oil and Gas Journal, November 4, 1957, pp. 154–155.

CHARLES E. O'CONNELL, *Primary Examiner.*

EARL J. WITMER, *Examiner.*

R. A. STENZEL, *Assistant Examiner.*

UNITED STATES PATENT OFFICE
CERTIFICATE OF CORRECTION

Patent No. 3,266,256                          August 16, 1966

William R. Postlewaite et al.

It is hereby certified that error appears in the above numbered patent requiring correction and that the said Letters Patent should read as corrected below.

Column 2, line 20, for "opertion" read -- operation --; column 5, lines 57 to 58, the equation should appear as shown below instead of as in the patent:

$$R = \frac{R_o}{H} \ln\left(1 + \frac{H}{R_o} + \sqrt{\left(\frac{H}{R_o}\right)^2 + 2\frac{H}{R_o}}\right)$$

column 6, lines 31 to 32, for "$\frac{F=1180}{A\ 4.40}$" read -- $\frac{F=1180}{A\ 4.41}$ --; column 10, line 20, for "wtih" read -- with --; lines 29 to 30, for "at a predetermined location in deep water" read -- in deep water at a predetermined location --; column 12, line 9, for "pullling" read -- pulling --.

Signed and sealed this 22nd day of August 1967.

(SEAL)
Attest:

ERNEST W. SWIDER                          EDWARD J. BRENNER
Attesting Officer                         Commissioner of Patents